(12) United States Patent
Clary et al.

(10) Patent No.: US 6,259,043 B1
(45) Date of Patent: *Jul. 10, 2001

(54) METHODS, SYSTEMS AND PRODUCTS PERTAINING TO A DIGITIZER FOR USE IN PAPER BASED RECORD SYSTEMS

(75) Inventors: Gregory James Clary, Apex, NC (US); Thomas Allan Corbi, Sherman, CT (US); Robert Joseph Evans, Cary, NC (US); Peter Dirk Hortensius, Goldens Bridge, NY (US); John Peter Karidis, Ossining, NY (US); Krishna Sundaram Nathan, New York, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,735

(22) Filed: Nov. 12, 1996

Related U.S. Application Data

(60) Provisional application No. 60/010,443, filed on Jan. 23, 1996.

(51) Int. Cl.[7] .................................................. G08C 21/00
(52) U.S. Cl. .................................. 178/18.01; 178/18.03; 178/18.05; 178/18.06; 178/18.07
(58) Field of Search ..................................... 345/146, 156, 345/173, 179, 438, 441; 235/375–382; 382/119, 187, 188, 189, 313, 325; 128/18.01, 18.03, 18.06, 18.07, 19.01, 19.03, 19.04

(56) References Cited

U.S. PATENT DOCUMENTS

| | | | |
|---|---|---|---|
| D. 354,772 | 1/1995 | Flickinger et al. | D19/88 |
| D. 383,496 | 9/1997 | Siegel et al. | D19/88 |
| 3,111,646 | 11/1963 | Harmon | 340/146.3 |
| 3,204,356 | 9/1965 | Close et al. | 40/10 |
| 3,514,874 | 6/1970 | Strohl | 35/37 |

(List continued on next page.)

FOREIGN PATENT DOCUMENTS

| | | | |
|---|---|---|---|
| 31 13 105 A1 | 4/1981 | (DE) | G06F/3/12 |
| 2 087 611 | 5/1982 | (GB) | G06F/3/02 |
| 58-2060 | 6/1956 | (JP) | G06K/3/00 |
| 52-36932 | 3/1977 | (JP) | G06F/3/00 |
| 54-10634 | 1/1979 | (JP) | G06F/3/02 |

(List continued on next page.)

OTHER PUBLICATIONS

Conference Electronic Text Communication, Munich, Germany "Teleboard Scribophone and their Relation to "Coded . . " J.L. Bordewijk pp291–303.

Microcomputing 9/83 #81 "Something to Write About" K. Lord pp. 52–54.

(List continued on next page.)

Primary Examiner—Vijay Shankar
(74) Attorney, Agent, or Firm—Paul J. Otterstedt

(57) ABSTRACT

Real time digitization of handwritten text and integration of digital recordation of handwritten text with traditional paper-based record making systems is achieved with a recording unit which may record a sequential data stream of strokes and associated events. The data stream may be stored in the apparatus and processed in accordance with various applications. Recordation of handwritten strokes may be accompanied by automatic detection and recordation of predefined events, and by user invoked generation of events. Recorded handwritten text may be processed to produce character strings or image data for text recorded in conjunction with predefined events.

38 Claims, 13 Drawing Sheets

U.S. PATENT DOCUMENTS

| | | | |
|---|---|---|---|
| 3,697,687 | 10/1972 | Larson et al. | 178/18 |
| 4,034,155 | 7/1977 | Muller et al. | 178/19 |
| 4,047,010 | 9/1977 | Perotto et al. | 235/156 |
| 4,112,597 | 9/1978 | Seaver | 35/36 |
| 4,143,240 | 3/1979 | Kobayashi et al. | 178/19 |
| 4,158,747 | 6/1979 | Muller et al. | 178/19 |
| 4,276,541 | 6/1981 | Inoue et al. | 340/146 |
| 4,475,239 | 10/1984 | van Raamsdonk | 382/57 |
| 4,493,104 | 1/1985 | Lukis et al. | 382/13 |
| 4,555,590 | 11/1985 | Kishi et al. | 178/18 |
| 4,600,807 | 7/1986 | Kable | 178/19 |
| 4,649,232 | 3/1987 | Nakamura et al. | 178/18 |
| 4,656,317 | 4/1987 | Tsugel et al. | 178/18 |
| 4,679,241 | 7/1987 | Lukis | 382/13 |
| 4,697,048 | 9/1987 | Clements et al. | 178/18 |
| 4,697,050 | 9/1987 | Farel et al. | 178/18 |
| 4,752,965 | 6/1988 | Dunkley et al. | 382/3 |
| 4,791,592 | 12/1988 | Burgess | 364/572 |
| 4,806,918 | 2/1989 | Berke | 340/712 |
| 4,866,646 | 9/1989 | Nakamura et al. | 364/709.1 |
| 5,030,990 | 7/1991 | Iwaki et al. | 355/204 |
| 5,043,762 | 8/1991 | Iwaki et al. | 355/204 |
| 5,049,862 | 9/1991 | Dao et al. | 340/706 |
| 5,067,573 | 11/1991 | Uchida | 178/18 |
| 5,107,541 | 4/1992 | Hilton | 382/3 |
| 5,120,906 | 6/1992 | Protheroe et al. | 178/18 |
| 5,133,554 | 7/1992 | Piccinini, Sr. | 273/148 R |
| 5,157,737 * | 10/1992 | Sklarew | 345/173 |
| 5,194,852 | 3/1993 | More et al. | 340/712 |
| 5,215,397 | 6/1993 | Taguchi et al. | 401/194 |
| 5,223,677 | 6/1993 | Kapp et al. | 178/18 |
| 5,227,590 | 7/1993 | Protheroe et al. | 178/18 |
| 5,233,547 | 8/1993 | Kapp et al. | 364/705 |
| 5,243,149 | 9/1993 | Comerford et al. | 178/18 |
| 5,247,285 | 9/1993 | Yokota et al. | 345/919 |
| 5,313,051 | 5/1994 | Brigida et al. | 235/375 |
| 5,322,978 | 6/1994 | Protheroe et al. | 178/18 |
| 5,347,589 * | 9/1994 | Meeks | 345/179 |
| 5,380,958 | 1/1995 | Protheroe et al. | 178/18 |
| 5,389,745 * | 2/1995 | Sakamoto | 345/179 |
| 5,411,790 | 5/1995 | Ogawa et al. | 428/209 |
| 5,444,182 | 8/1995 | Shetye et al. | 198/18 |
| 5,448,044 | 9/1995 | Price et al. | 235/380 |
| 5,455,901 | 10/1995 | Friend et al. | 395/149 |
| 5,477,012 | 12/1995 | Sekendur | 178/18 |
| 5,526,023 | 6/1996 | Sugimoto et al. | 345/173 |
| 5,528,154 | 6/1996 | Leichner et al. | 324/693 |
| 5,530,207 | 6/1996 | Dolling | 178/18 |
| 5,539,159 | 7/1996 | Protheroe et al. | 178/18 |
| 5,561,282 | 10/1996 | Price et al. | 235/380 |
| 5,570,109 * | 10/1996 | Jenson | 345/146 |
| 5,587,560 | 12/1996 | Crooks et al. | 178/18 |
| 5,590,107 | 12/1996 | Chatani | 369/54 |
| 5,602,570 * | 2/1997 | Capps et al. | 345/179 |
| 5,612,720 * | 3/1997 | Ito | 345/179 |
| 5,627,349 * | 5/1997 | Shetye | 178/18 |
| 5,629,499 | 5/1997 | Flickinger et al. | 178/18 |
| 5,631,741 | 5/1997 | Matthews | 358/296 |
| 5,644,339 * | 7/1997 | Mori et al. | 345/173 |
| 5,652,412 * | 7/1997 | Lazzouni et al. | 345/179 |
| 5,654,529 | 8/1997 | Yeung et al. | 178/18 |
| 5,659,164 | 8/1997 | Schmid et al. | 235/375 |
| 5,661,506 * | 8/1997 | Lazzouni et al. | 345/179 |
| 5,734,129 * | 3/1998 | Belville et al. | 178/19.01 |
| 5,850,214 * | 12/1998 | McNally et al. | 345/173 |

FOREIGN PATENT DOCUMENTS

| | | | |
|---|---|---|---|
| 54-24540 | 2/1979 | (JP) | G06F/3/00 |
| 54-120531 | 9/1979 | (JP) | G06F/3/02 |
| 60-131041 | 9/1985 | (JP) | G06F/3/02 |
| 62-77625 | 4/1987 | (JP) | G06F/3/03 |
| 62-271122 | 11/1987 | (JP) | G06F/3/03 |
| 62-271123 | 11/1987 | (JP) | G06F/3/03 |
| 62-271124 | 11/1987 | (JP) | G06F/3/03 |
| 62-274413 | 11/1987 | (JP) | G06F/3/03 |
| 2525365 | 5/1996 | (JP) | G06F/3/03 |
| WO 92/09944 | 6/1992 | (WO) . | |

OTHER PUBLICATIONS

SIGCHI Bulletin 7/86 Vo. 18 #1 "A Directory of Sources for Active Technologies" pp 58–63 W. Buxton.

cae Computer—Aided Engineering 5/87 vol. 6, #5 "Automatic Digitizers Turn Hardcopy to CAD Copy", Ebbe Reker.

Byte Reviews 4/92 "Rough Gems: First Pen Systems Show Promise, Lack Refinement" pp. 212–222 Nicolas Baran.

Pen—Based Computing "The Mighty Pen", Informationweek Dec. 30, 1991 p 13 Tony Baer.

B.A. Barker et al, "Method for Creating Annotation Data", 9/85 IBM Tech. Disc. Bulletin, vol. 28 No. 4, pp. 1623–1628.

* cited by examiner

METHODS, SYSTEMS AND PRODUCTS PERTAINING TO A DIGITIZER FOR USE IN PAPER BASED RECORD SYSTEMS

PRIORITY

This application is a continuation in part of provisional application Ser. No. 60/010,443, filed Jan. 23, 1996.

FIELD OF THE INVENTION

The invention pertains to the field of devices for real time digitization and recognition of handwritten text. The invention addresses the problem of integrating digital recordation of handwritten text with traditional paper-based record making systems.

BACKGROUND OF THE INVENTION

A variety of technology is known for digitizing handwritten text as the text is written, and for processing of handwritten text data. Typical digitization equipment employs a digitizing tablet which generates data representing the coordinates of a stylus applied to the tablet. Present technology includes digitizing tablets which generate positional information by detecting radio frequency emissions generated by the stylus. The typical stylus of this type may also be provided with an inking tip, and typically further includes a pressure sensor which generates a signal when the stylus is in contact with a surface (a "pen down" signal). This signal may be conveyed to the digitizing tablet by means of a dedicated line or through a secondary radio frequency transmission. By monitoring the pen down signal and the path of the stylus radio emission across a radio-sensitive grid, the digitizing tablet may generate a data stream representing the pen strokes ("strokes") which comprise text written on or in proximity to the surface of the digitizing tablet.

Digitizing tablets are primarily used as input devices for data processing systems. For example, a digitizing tablet and its accompanying stylus may be coupled to a personal computer such that lines traced on the tablet with the stylus are recorded as input to the computer. See, e.g., Tsugei et al., U.S. Pat. No. 4,656,317. It is known to overlay a digitizing tablet with a grid or other form for indicating the proper location on the tablet for entering a particular type of input. See, e.g., Abe, et al., U.S. Pat. No. 4,136,336. It is further known to overlay a display device such as an LCD screen with a transparent digitizing tablet, thus allowing a computer-generated form to be displayed which is visible through the digitizing tablet and allowing the strokes produced by the stylus to be displayed on the display device. See, e.g., Dao et al, U.S. Pat. No. 5,049,862; Ito et al., U.S. Pat. No. 5,177,328.

Present technology further includes the ability to convert stroke data to character strings using a variety of known recognition processes. Generation from stroke data of image data representing a graphical display of the strokes is also known.

With particular regard to integration of digitizing tablets with tasks which are paper-oriented, it is known to combine a digitizing tablet with a scanner, thus allowing a handwritten document to be initially scanned into memory and then altered in memory by input generated by use of a stylus and digitizing tablet. See, e.g., Comerford et al., U.S. Pat. No. 5,243,149. It is also known to overlay the input window of a photocopier with a digitizing tablet such that particular areas of a document may be indicated for copying by circumscribing these areas of the document using the stylus as the document lies on the window. See, e.g., Kishi et al., U.S. Pat. No. 4,745,491.

SUMMARY OF THE INVENTION

Although instructive as to the operation of the individual components described above, the prior art does not disclose or suggest a way in which these components may be employed in conjunction with conventional paper-based hand written record making tasks. Examples of conventional paper-based record making tasks include note-taking during meetings or classes using notebooks or pads of paper, the recording of addresses and phone numbers in paperbased address books, and the making of "to do" lists and reminder notes. While the prior art suggests that these functions may be performed using a computer as a recording medium and a digitizing tablet and stylus as an input device, such a system would require the user to forego the benefits of paper-based records. These benefits include portability and ease of record retrieval, ease of protection of records, ease of record production, ease of browsing a large amount of records, and the familiar tactile experience of writing on paper.

The present invention combines the benefits of digitizing technology and handwritten record making. In general terms, the invention may be embodied in a recording unit which includes a system for recording a digital copy of records responsive to production of the records by hand using ink on paper or another writing medium associated with the recording unit. A user may produce handwritten records on the writing medium using an inking stylus of the type described above. A data stream reflecting strokes and associated events may be generated by a digitizing tablet included in the recording unit. The digitized record may be stored in nonvolatile memory associated with the digitizing tablet as the data stream is produced. The events reflected in the data stream may be automatically generated by the unit or may be user invoked. User invoked events may include events indicating the particular page upon which the user is writing and events characterizing groups of strokes as being of a predefined type, for example, as being an address book entry.

The invention may further be embodied in systems and methods for utilizing data recorded in the manner described above. Such systems may sort data into collections of strokes and events. Strokes and associated events may further be organized into collections of fields. Strokes or fields may in turn be provided as input to a recognition engine to produce character strings, or to an image data generator to produce image data.

The invention thus provides a non-tethered stand-alone unit for generating a data stream representative of handwritten text and for recording and storing the data stream without the assistance of another computer system. In this manner, data may be recorded by the unit at any time and may be later transferred to another computer system for processing in accordance with various applications.

DESCRIPTION OF THE DRAWINGS

The features summarized above, as well as other features, implementations of the invention and modifications thereof will be more readily understood from the following detailed description of certain preferred embodiments of the invention, when considered in conjunction with the accompanying drawings in which.

DETAILED DESCRIPTION OF THE INVENTION

The invention is disclosed in four sections. The first section presents exemplary recording unit hardware. The second section presents recording unit control and data recordation processes. The third section presents exemplary methods for processing data recorded in accordance with the invention. The fourth section presents alternative embodiments in accordance with the invention.

I. Exemplary Recording Unit Hardware

Figure 1:
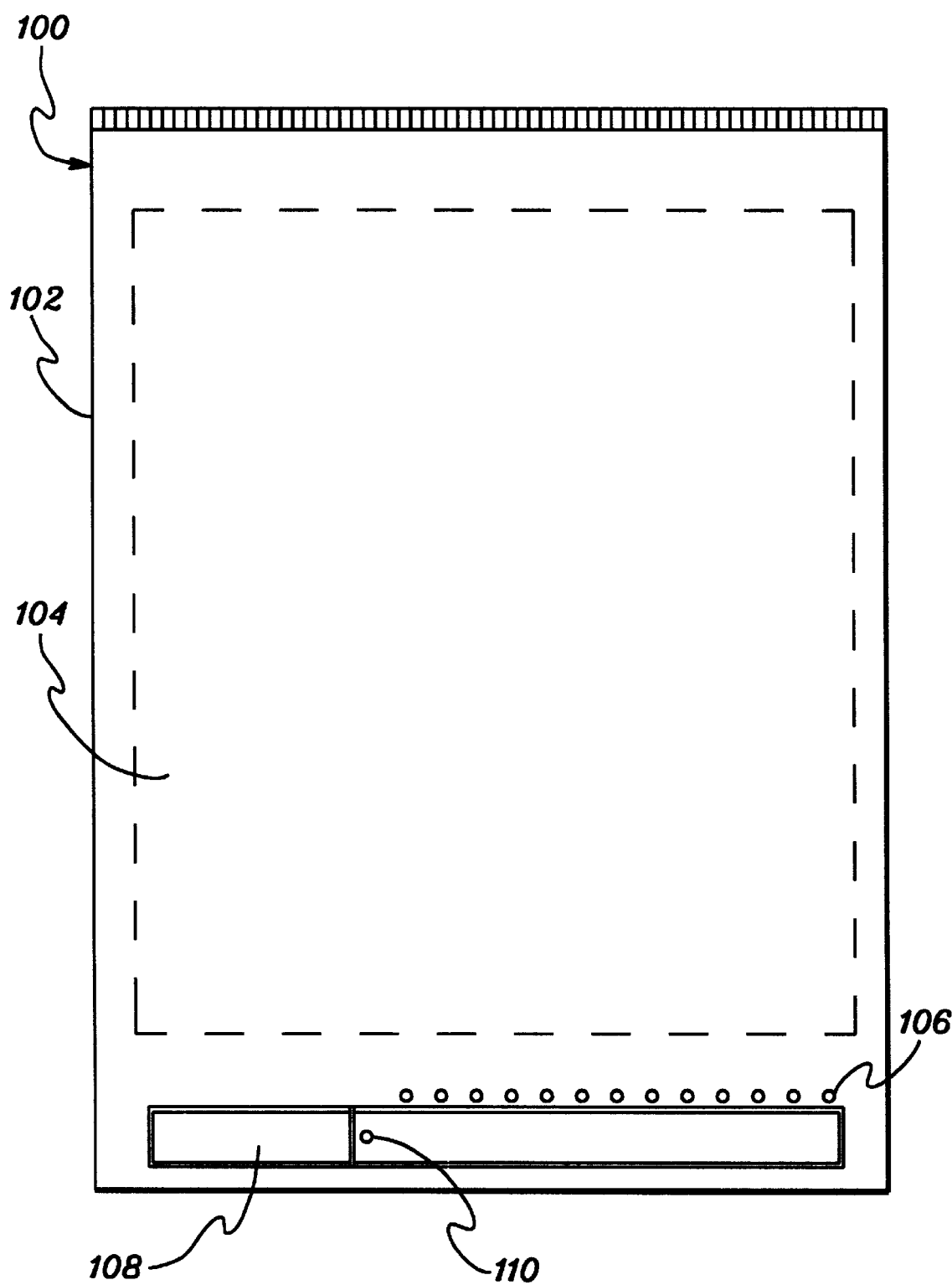
FIG. 1 illustrates a front elevational view of hardware of an embodiment of the invention.

Reference is made to FIG. 1, which shows a recording unit 100 in accordance with the invention. The recording unit may include a housing 102 including an area 104 which overlies a digitization tablet (the outline of which is indicated by broken lines). The digitization tablet includes an active area capable of receiving electromagnetic signals from a radio frequency coupled stylus. The digitization tablet may be provided such that a portion of the active area has a form factor coinciding with that of a standard paper size. In the illustrated embodiment, the portion of the active area bounded by the top and sides of the surrounding housing and terminating at the broken line has a form factor of 8.5 inches by 11 inches, which coincides with the form factor of standard writing paper. Alternative form factors may be provided to match a different standard paper size (such as A4) or to match an application-specific standard paper size, for example, a standard check book form factor.

The digitization tablet may further be provided with several "soft buttons" 106. A soft button is an area within the active portion of the digitizing tablet which is predefined to indicate a specific input value when stroke information is detected within the soft button area. In the illustrated embodiment, soft buttons 106 are provided in a horizontal row near the bottom of the digitizing unit. However, such buttons may be located in any active portion of the digitizing tablet, and their locations may be designated by default or through a user customization procedure. The function of a soft button may be indicated with an icon or other legend.

An LCD display screen 108 may be provided on a portion of the recording unit. The display screen may be used to provide user prompts and other information. For example, the LCD screen may display prompts directing the user to provide input to the unit. To the right of the display screen is a "pen-down" indicator 110 which may be illuminated during periods of contact between a stylus (not shown) and a surface of a writing medium attached to the recording unit.

Figure 2:
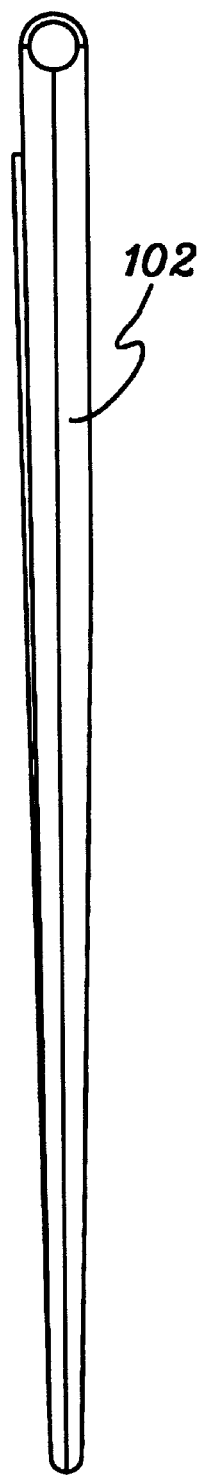
FIG. 2 illustrates a side elevational view of the embodiment of FIG. 1.
Figure 3:
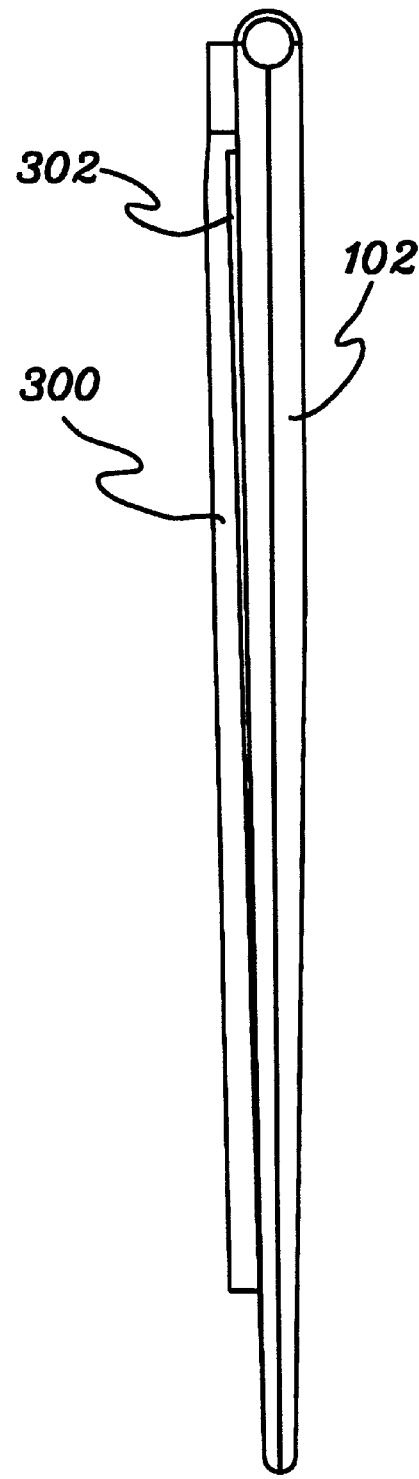
FIG. 3 illustrates a side elevational view of the embodiment of FIG. 1 including a standard pad of writing paper secured thereto.

FIGS. 2 and 3 illustrate the embodiment of FIG. 1 as seen from the side. It will be noted that this embodiment has a profile which is particularly thin relative to the length of the apparatus. A thin profile is preferable because it facilitates the deployment of the device in locations where paper is traditionally stored, such as portfolios and notebooks. In particular, FIG. 3 illustrates the embodiment including a pad of paper 300 retained in proximity to the digitizing surface of the digitizing tablet. The pad is retained by a retainer 302. In the illustrated embodiment, the retainer comprises a pocket into which the back panel of a pad of paper may be inserted. Such a retainer is preferable in this embodiment because it is capable of providing replicable alignment between the digitizing tablet and the pad of paper. Where such a retainer is employed, the paper may be removed and later be replaced with the same alignment to the digitizing surface. Those of ordinary skill in the art will recognize that the function of the retainer may be acceptably performed in accordance with the purpose of the invention by a multitude of other well-known devices.

Figure 4:
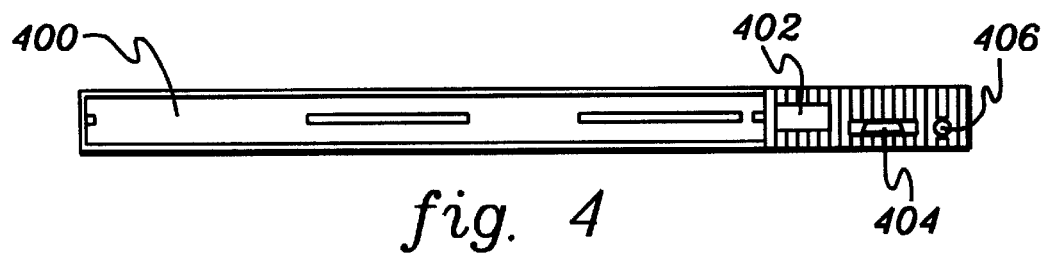
FIG. 4 illustrates a top elevational view of the embodiment of FIG. 1.

FIG. 4 illustrates the embodiment of FIG. 1 as seen from the top. The top face of the recording unit may include a battery compartment 400 (shown uncovered), an IR transceiver lens 402, an RS-232 serial port coupling 404, and an AC power adapter coupling 406. The illustrated battery compartment is provided as a dual technology compartment capable of receiving either four AAA sized batteries or a NiMH battery pack.

Figure 5:
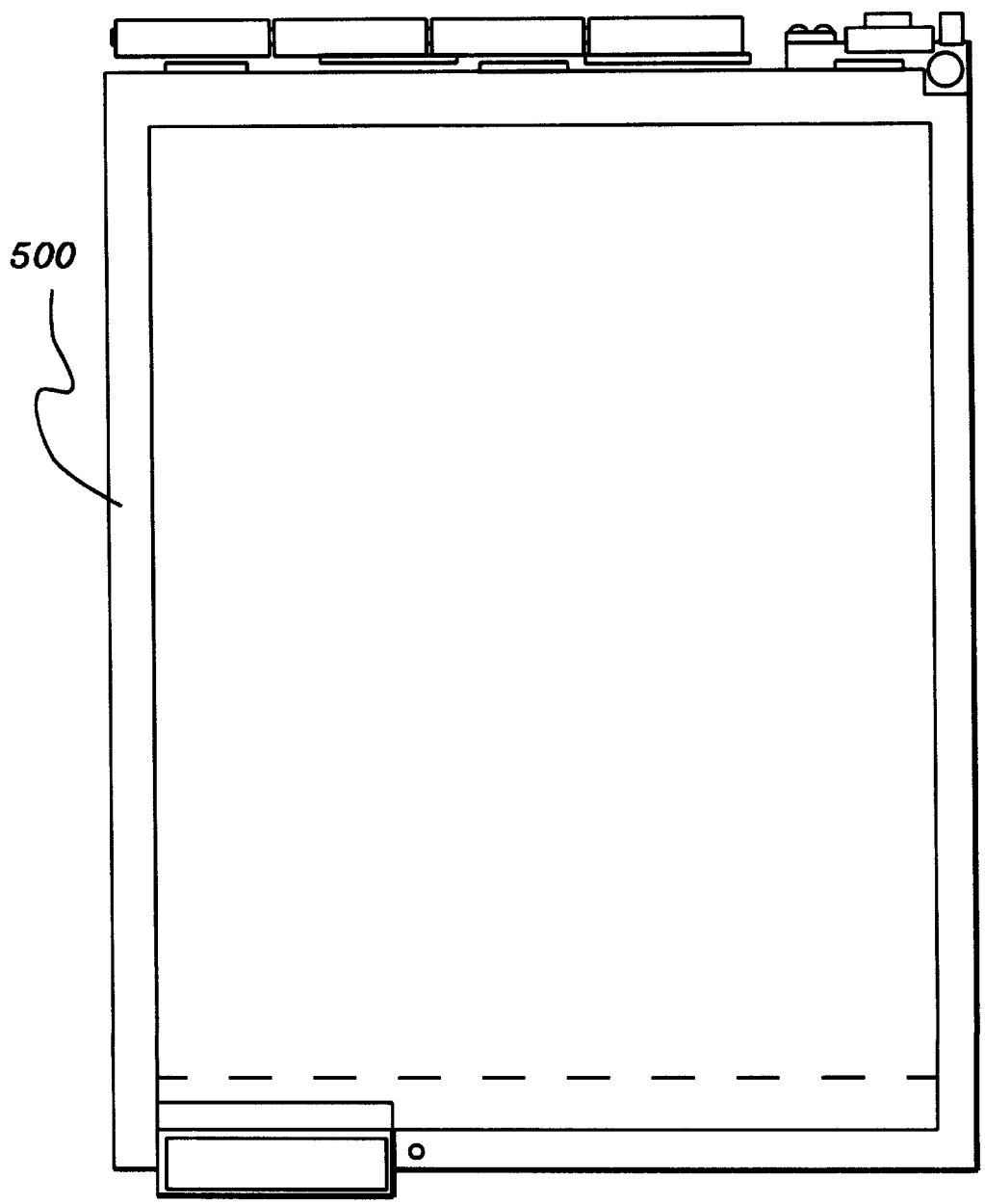
FIG. 5 illustrates a top elevational view of the layout of a digitizing tablet and related components of the embodiment of FIG. 1.
Figure 6:
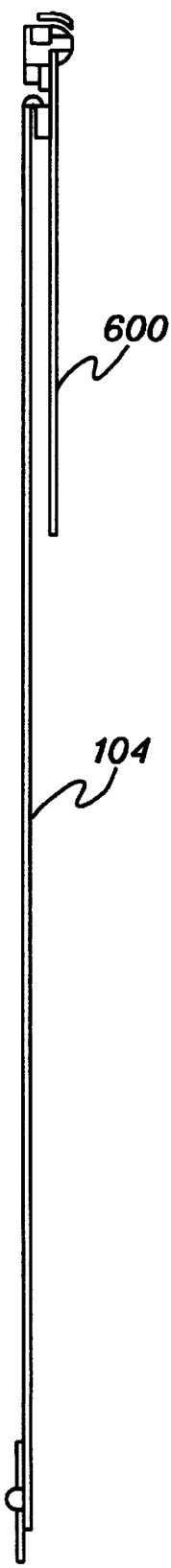
FIG. 6 illustrates a side elevational view of a digitizing tablet, circuit board, and related components of the embodiment of FIG. 1.

FIG. 5 illustrates the embodiment of FIG. 1 with the housing removed. It can be seen that the digitizing tablet 104 includes an inactive peripheral area surrounding the active area. FIG. 6 shows the components of FIG. 5 from the side, including a circuit board 600 located beneath the digitizing tablet 104.

Figure 7:
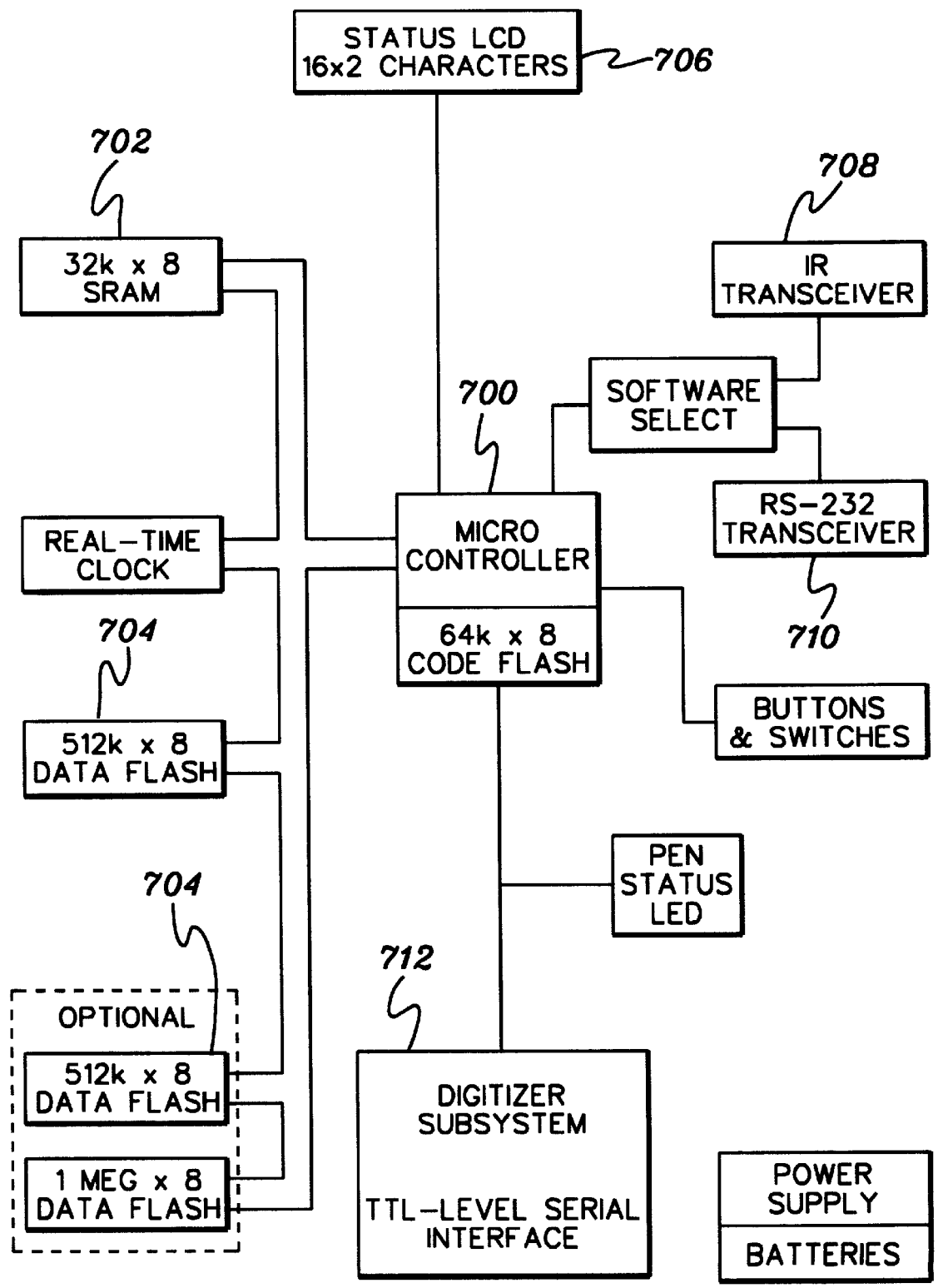
FIG. 7 illustrates a block diagram of hardware components of an embodiment in accordance with the invention.

A block diagram of hardware components of an embodiment of the invention is provided in FIG. 7. The system is managed by a microcontroller 700 which is coupled to volatile 702 and nonvolatile 704 memory devices, a display 706, and output devices including an infrared transceiver 708 and an RS-232 serial port 710 for enabling interfacing with other systems. The microcontroller is further coupled to a digitizer subsystem 712 comprising a digitizing chip set and an electromagnetic sensor (not shown). Using software stored in memory, the microcontroller may manage the operation of the hardware such that the data stream generated by the digitizing tablet in response to strokes produced by the inking stylus is processed and recorded in memory. Particular features of this operation and the means by which it is implemented are described in detail below.

An embodiment of the invention such as that shown in FIGS. 1–7 is thus employable as a unit for generating and recording a data stream representing handwritten text. A user may use the unit in conjunction with a standard notebook, a pad of paper, or individual sheets of paper by simply placing the paper against the surface of the unit above the digitizing tablet and writing on the paper with the inking stylus. Alternatively, a user may attach a clip board to unit by means of the retaining means. As noted above, the unit may be provided to accommodate a variety of form factors. Strokes produced in ink on the paper will be represented in the data stream generated by the unit. As a given page is filled with handwritten strokes, the data stream is recorded, effectively creating a record of the entire page of handwritten notes in the order in which they are written.

II. Exemplary Recording Unit Control and Data Recordation Processes

As disclosed above, the invention may be embodied in a recording unit which includes a digitization tablet, a stylus, and associated microcontroller and data storage devices. The invention may further include control and data recordation processes implemented on the recording unit. Control and data recordation processes may be implemented by the microcontroller under the control of appropriate software. Particular control and data recordation processes which may be implemented in accordance with the invention are disclosed in FIGS. 8–12 and the accompanying discussion.

Data recordation is generally accomplished through the detection of strokes and "events". For purposes of the invention, an event is an occurrence which is assigned a predefined meaning. A variety of events may be defined which facilitate the recording or processing of the data stream.

Events may be generally categorized as being either automatically generated by the recording unit or as being user invoked. Automatically generated events are events which occur and are detected and recorded without specific input from the user. For example, there may be defined a pen-down event which indicates that the stylus was brought into contact with the writing surface and a pen-up event which indicates that the stylus was lifted from the writing surface. A stroke may thus be defined as a series of pen coordinates recorded between a pen-down and a pen-up event. There may further be defined a "pen-up-in-proximity" event, which indicates that the stylus was lifted from the writing surface but remained within proximity of the digitizing tablet. Such an event may be detected by monitoring the stylus radio emission and pen-down signal and may be recorded automatically. Similarly, there may be defined a "pen-up-out-of-proximity" event, which indicates that the stylus was removed from the writing surface to a location which is relatively distant from the digitizing tablet. Additional events such as the invocation of "soft buttons" or switches may be defined to have particular meanings, as described in detail below.

Figure 8:
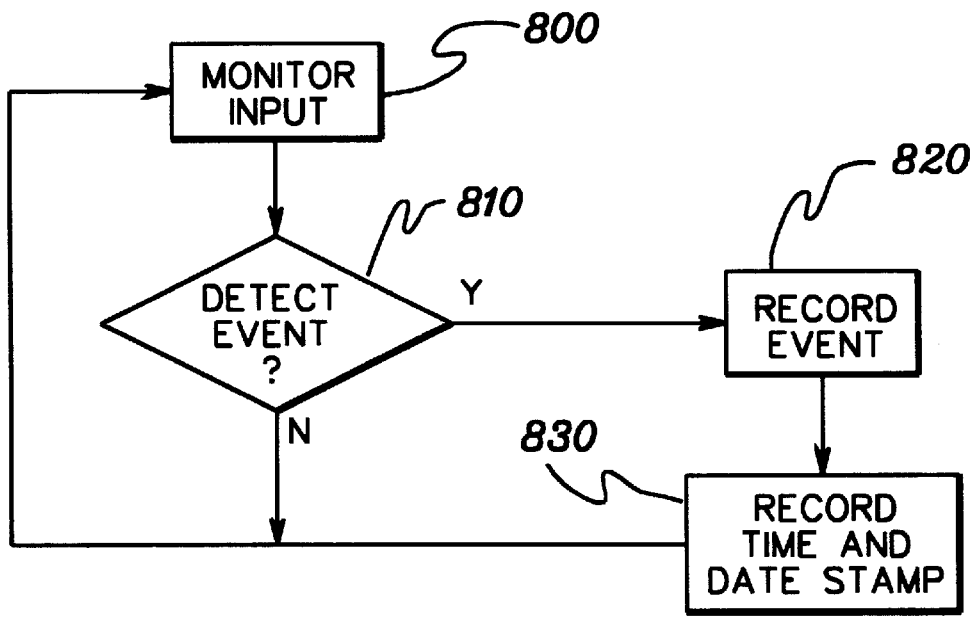
FIG. 8 illustrates a flow diagram for generation of an event in accordance with the invention.

FIG. 8 provides an example of a process for automatically generating events. As shown in FIG. 8, during operation of the device, system input may be monitored 800. When a predefined event is detected 810, for example, a pen-up-in-proximity event, a unique data string identifying the event is recorded 820. The system then records a time and date stamp 830 which indicates the time and date at which the event occurred. The recording of a time and date stamp in association with each event facilitates later processing of stroke and event data, as discussed in detail below.

Figure 8A:
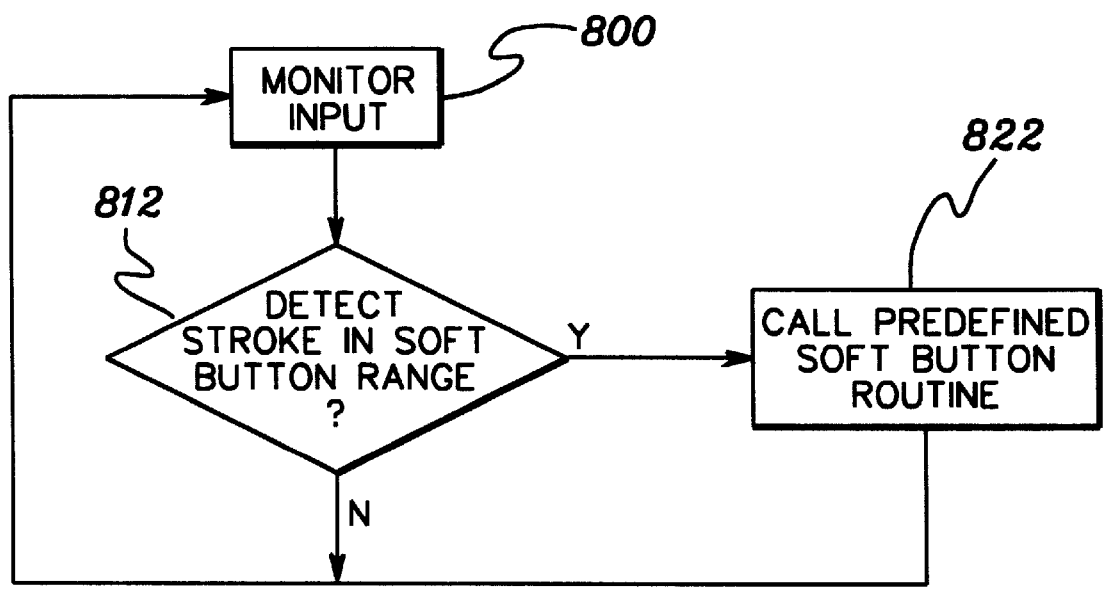
FIG. 8a illustrates a flow diagram for "soft button" operation in accordance with the invention.

FIG. 8a illustrates the automatic detection of a "soft button" event. As discussed in reference to FIG. 1, a soft button is a predefined area within the active area of the digitizing tablet. When stroke data is detected as occurring within the predefined area of the soft button, the soft button event is automatically generated by the system. More specifically, as illustrated in FIG. 8a, during monitoring 800 of input, the system may detect 812 stroke data occurring within the designated area of a soft button. In response, a routine associated with the activation of the soft button is called 822.

Figure 9:
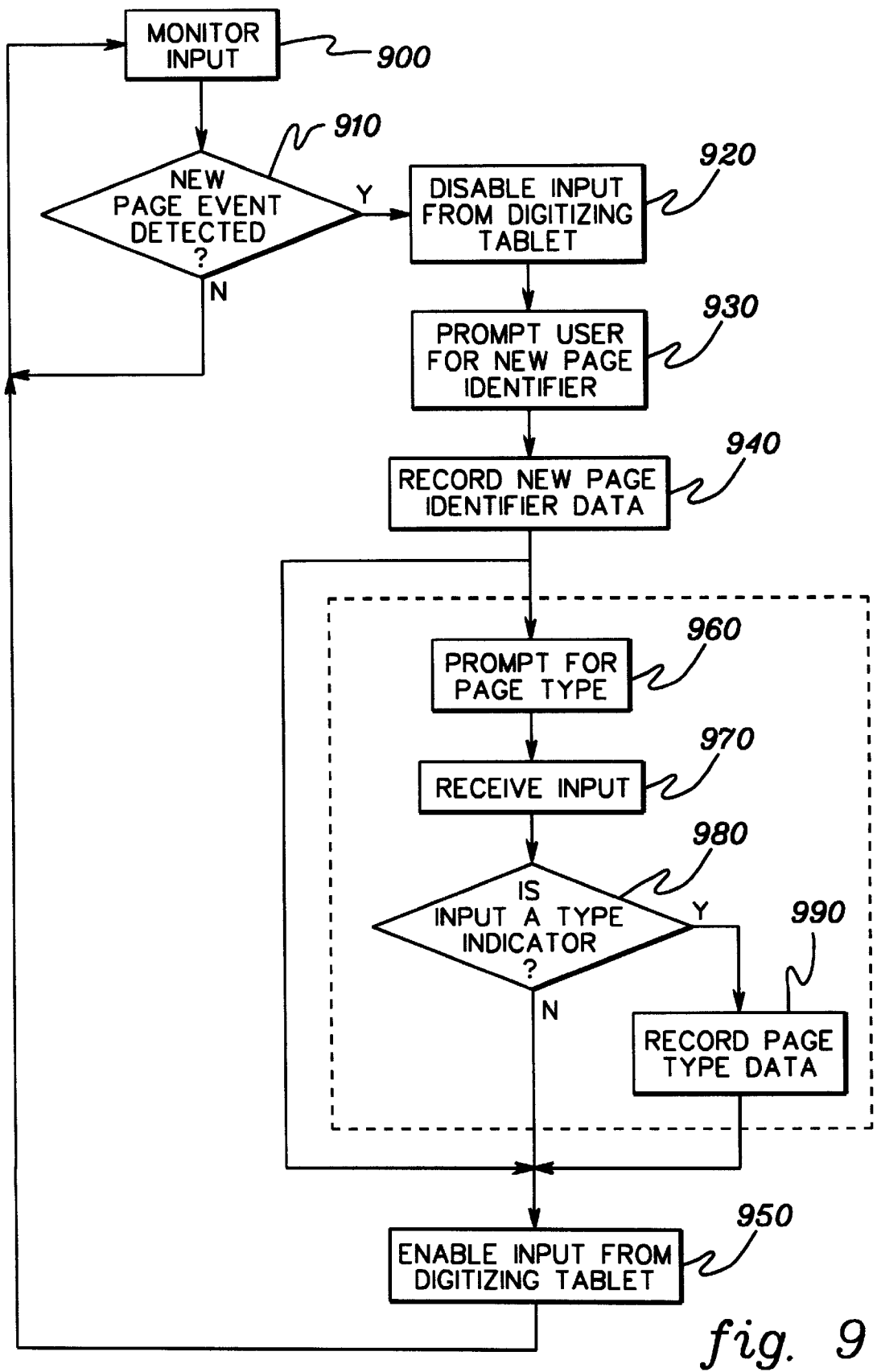
FIG. 9 illustrates a flow diagram for a "new page event" operation in accordance with the invention.

As noted above, some events may be user invoked. FIG. 9 illustrates the generation and recordation of a user invoked "new page" event. The new page event is used to identify the particular page of a writing medium upon which subsequent strokes will be made. By associating recorded stroke data with an identifier of a particular page, the user is enabled to switch pages at will. For example, the user may return to a page on which text was previously written and enter new text. Through the generation of a new page event prior to writing again on that page, the text subsequently entered will be associated with the proper page identifier. Later processing of the recorded stroke data may thus include reassembling the entire page from the various stroke data recorded at different times during the recording of the handwritten text.

Referring specifically to FIG. 9, during the course of monitoring 900 system inputs, a new page event may be detected 910. The new page event may be invoked by the user through operation of a switch or a soft button or some other means. Upon detection of the new page event, further input from the digitizing tablet is disabled 920. The user is then prompted 930 to enter a new page identifier such as a new page number. The system then records 940 the new page identifier data. At this point input from the digitizing tablet may be enabled 950. Alternatively, the system may further prompt 960 the user to enter a new page type. For example, the user may wish to indicate that the new page is specifically an address book page. Upon receiving 970 input from the user, the system will determine 980 whether the input indicates a particular page type or no page type. Data identifying a particular page type will be recorded 990 in memory. Subsequently, input from the digitizing tablet will be enabled 950 and the system will return to monitoring input and recording stroke data.

A second type of user invoked event may be referred to as a "stroke characterization" event. Stroke characterization events are used to indicate that certain strokes share a common characteristic. For example, a user may wish to indicate in the digital record of his handwritten text that a particular group of strokes should be presented in a certain typeface, such as underlined, bold faced, highlighted, or italicized. Similarly, the user may wish to designate a group of strokes as representing data of a particular predefined type. Examples of predefined data types include address book entries, to do list entries, calendar entries, notebook entries, checks, expense account entries, database entries, and key words. Similarly, the user may wish to indicate that a group of strokes should be processed later in a particular way, for example, imported into a particular application, faxed, or e-mailed.

Figure 10:
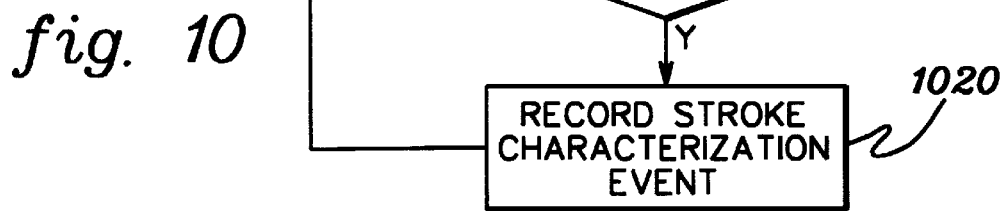
FIG. 10 illustrates a flow diagram of a "stroke characterization event" occurring in a "linear mode" in accordance with the invention.

Stroke characterization events such as those described above may be generated in a number of manners. A first manner involving a "linear model" of stroke characterization is illustrated in FIG. 10. As shown in FIG. 10 during monitoring 1000 of system input, the microcontroller may detect 1010 input indicating stroke characterization event. This event may comprise, for example, user activation of a soft button which indicates that text should be underlined. Data indicating the linear mode data type specification event is then recorded 1020 in the data stream. The use of linear mode stroke characterization will require the user to invoke the characterization event both prior to writing the characterized text and after writing the characterized text. Accordingly, stroke data located between two identical characterization events will be treated by the system as the strokes characterized by the characterization events. During such characterization, the LCD display may be used to provide a prompt to the user indicating that a linear mode characterization event has been invoked.

Other modes may also be provided for stroke characterization. Under some circumstances, a user may determine that data previously recorded should be labeled as being of a specific type. For example, the user may decide that a notation previously made should be entered into a list of "to do" items. In order to accomplish this with only the linear specification mode available, the user would be required to either specify the data type at the time of its original writing, or to rewrite the item, remembering this time to indicate the data type in linear mode. Accordingly, additional modes of type specification are desirable.

Figure 11:
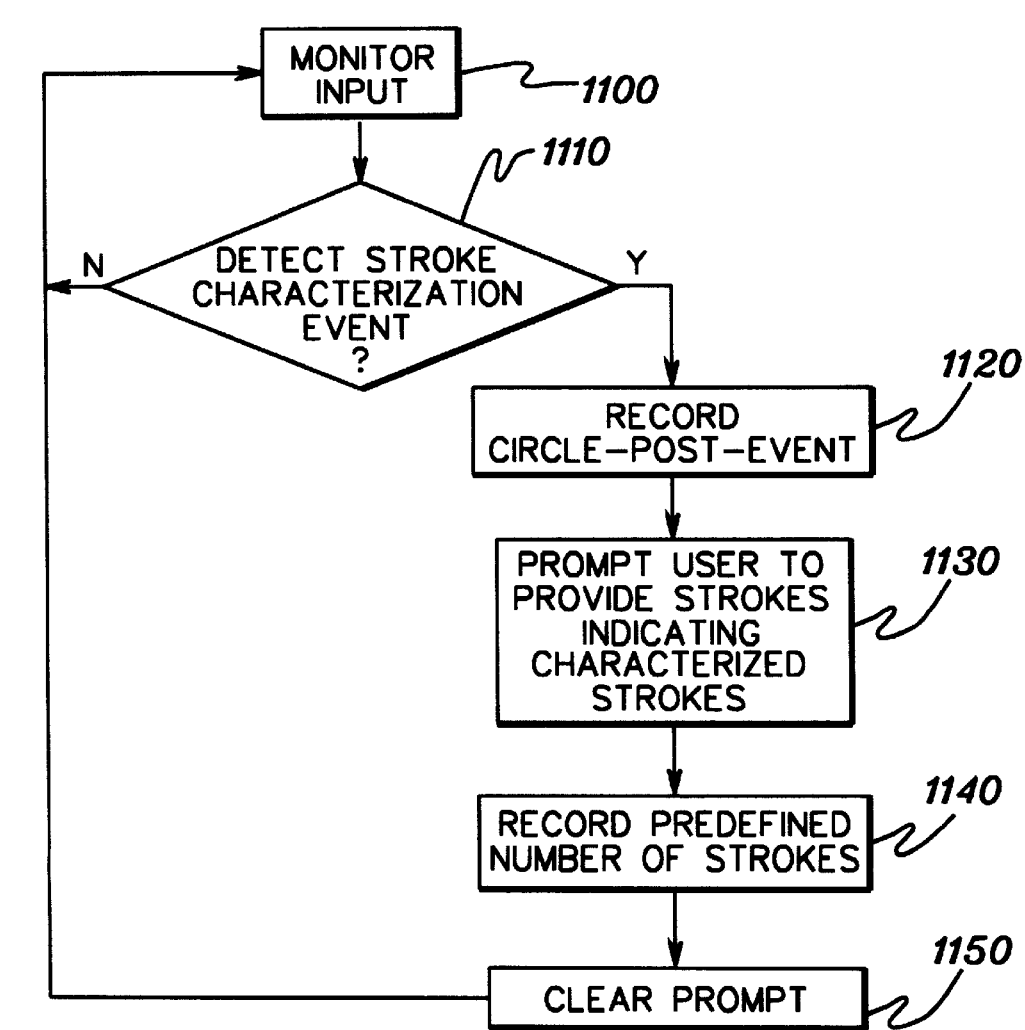
FIG. 11 illustrates a flow diagram of a stroke characterization event occurring in a "circle-post" mode in accordance with the invention.

An example of a "circle-post" mode of stroke characterization is illustrated in FIG. 11. In general terms, a circle-post mode of stroke characterization allows the user to indicate a stroke type, for example, by invoking a soft button, and then to indicate pre-existing strokes which are of that type by making one or more "bounding strokes" which indicate the extremities of an area within which the characterized strokes are encompassed. Bounding strokes may take the form of a circle, an "x" or any other shape which may be employed to delineate the extremities of an area. Thus through reference to bounding strokes, for example, a circle made in circle-post mode, a system may determine those pre-existing strokes which have been characterized by the user as being of a predefined type.

More specifically, as shown in FIG. 11, while monitoring 1100 system input in circle-post mode, the system may detect 1110 user invocation of a stroke characterization event. The system may then record 1120 a circle-post mode stroke characterization event and prompt 1130 the user to provide bounding strokes indicating the characterized strokes. The system may then record 1140 a predefined number of strokes before clearing 1150 the prompt. Accordingly, the data stream recorded by the system will include a circle-post mode stroke characterization event followed by a predefined number of bounding strokes indicating an area circumscribing the characterized strokes.

Alternatively, a similar "circle-pre" mode of stroke characterization may be provided. Circle-pre mode is analogous to circle-post mode in that characterized strokes are indicated by a predefined number of bounding strokes. However, in circle-pre mode, the bounding strokes precede the invocation of a circle-pre mode stroke characterization event. Thus, in circle-pre mode, the recorded data stream will include a predefined number of bounding strokes followed by a user generated circle-pre stroke characterization event.

Figure 12:
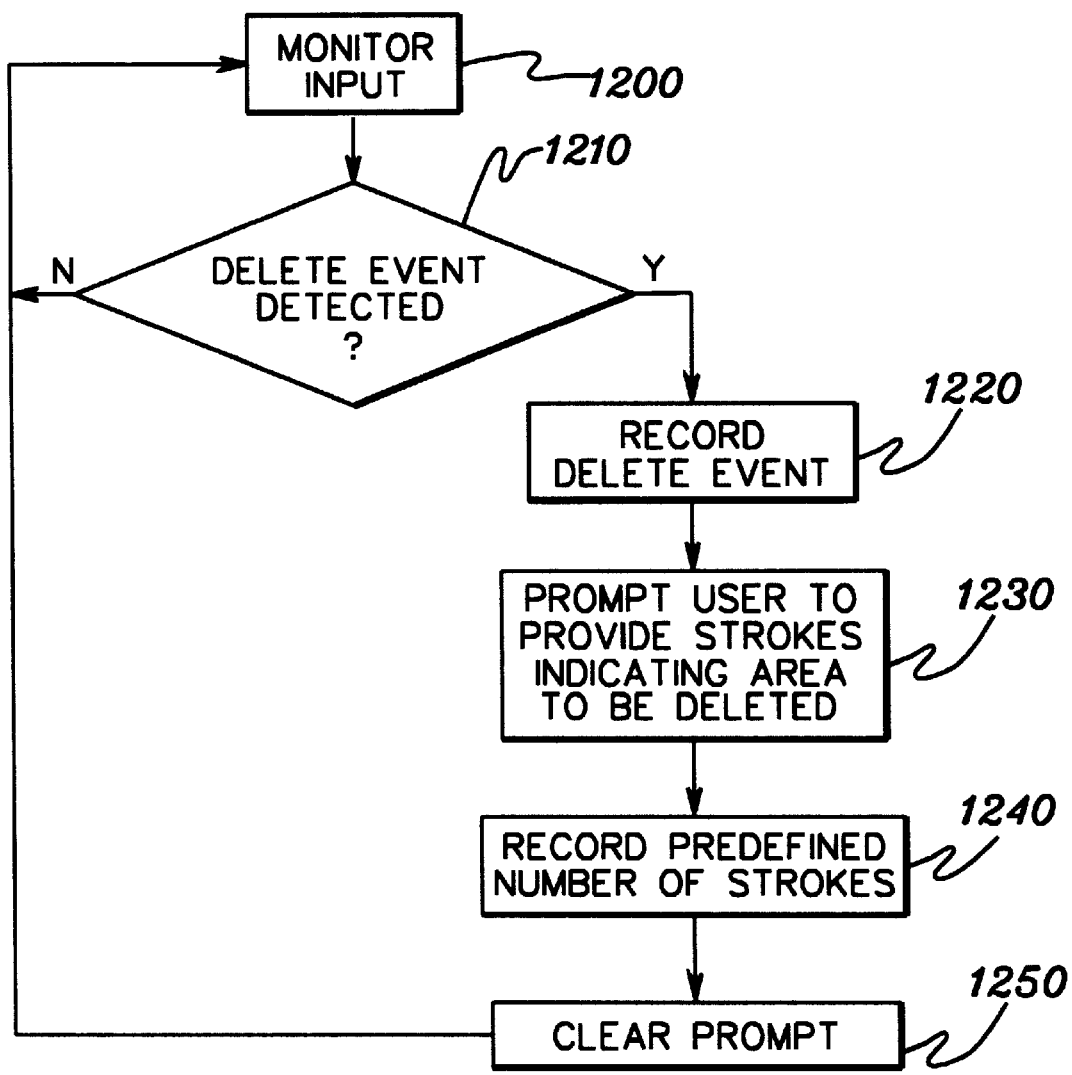
FIG. 12 illustrates a flow diagram of a "delete event" occurring in accordance with the invention.

The system may further provide a user invoked delete function which is analogous to the circle-pre and circle-post stroke characterization events in that strokes to be deleted are indicated by a predefined number of bounding strokes. An example of a process by which a system in accordance with the invention may provide a delete event is illustrated in FIG. 12. As shown in FIG. 12, during monitoring 1200 of system input, a delete event may be detected 1210. A delete event may then be recorded 1220, and the user may be prompted 1230 to provide bounding strokes indicating an area to be deleted. The system may then record 1240 a predefined number of strokes, and the prompt may then be cleared 1250.

Accordingly, a system in accordance with the invention may generate and record a data stream reflecting strokes generated by the user and events automatically generated by the system. The data stream is preferably compressed using one or more of the many well-known compression algorithms to reduce the storage space required for the data stream. The system may further record user invoked stroke characterization events, which may be provided by the user in linear, circle-post, or circle-pre modes. The system may further record user invoked delete events. The system will accordingly record a data stream which reflects the occurrence of strokes and events in the chronological order in which they occurred.

III. Exemplary Embodiment for Processing Recorded Data

As noted above, a data stream recorded in accordance with the invention contains strokes and events in the chronological order in which they occurred. This section discloses an exemplary embodiment of the invention for processing data recorded in accordance with the invention. Accordingly, the invention may further be embodied in systems, methods and products for processing the recorded data stream. It will be appreciated that the disclosed embodiments of the invention may be implemented on any data processing system which has access to a recorded data stream produced in accordance with the invention as described above. Accordingly, these embodiments may be implemented on a digitizing unit as described above, or on a computer which has access to a data stream recorded in accordance with the invention.

Figure 13:
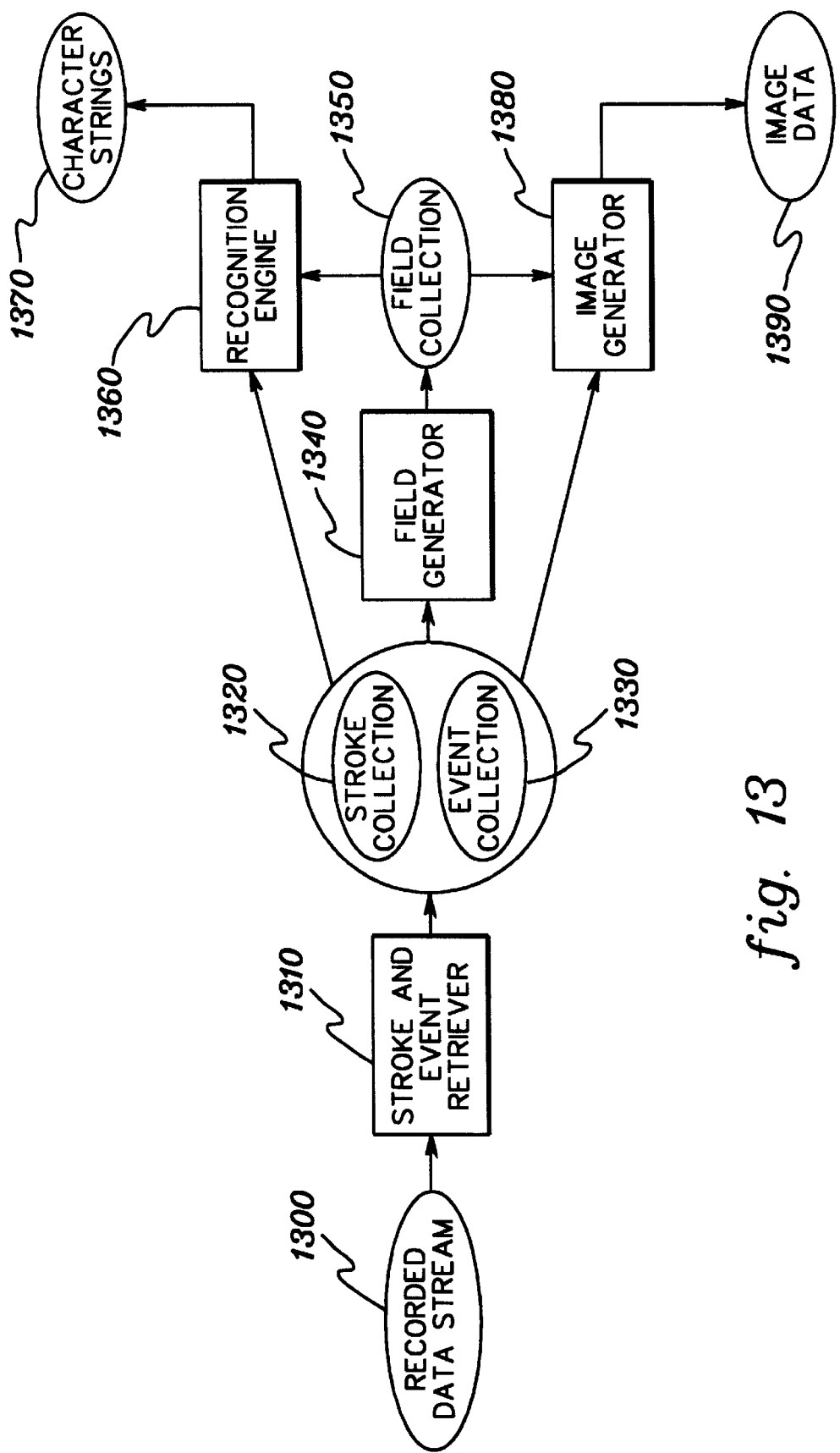
FIG. 13 illustrates an example of a system for processing data in accordance with the invention.

Reference is made now to FIG. 13, which illustrates the data objects and functional components of an exemplary system for processing information stored in a data stream recorded in accordance with the invention. A shown in FIG. 13, a recorded data stream 1300, which may be stored as a data file, may be processed by a stroke and event retriever 1310 to produce collections of strokes 1320 and collections of events 1330. The stroke and event retriever may produce collections of strokes and events through sorting and cataloging of the sequentially recorded stroke and event data. Stroke and event collections may take the form of data files which include one or more strokes or events along with time and date stamps indicating times of occurrence. Stroke and event collections may be processed by a field generator 1340 to produce collections of fields 1350. A field comprises an event and the strokes associated with the event. Field collections may take the form of data files which include or make reference to strokes and events. For many events, such as in the case of many system generated events, the field generator may generate fields by determining through reference to time and date stamps the strokes which are associated with particular events.

Figure 14:
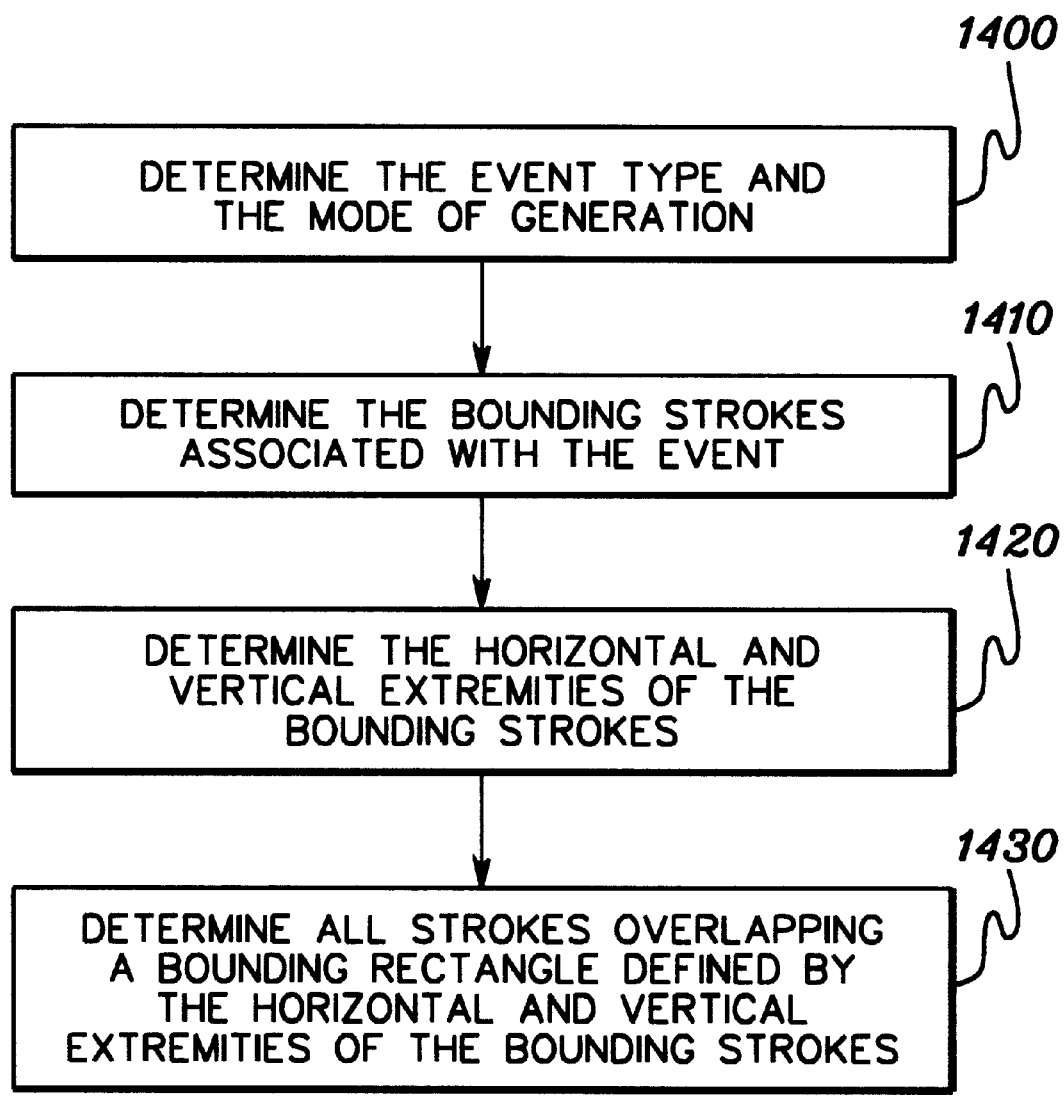
FIG. 14 illustrates an example of a process in accordance with the invention for determining strokes indicated by bounding strokes.

Fields for user invoked events involving the use of bounding strokes may be generated as illustrated in FIG. 14. As shown in FIG. 14, upon determining 1400 the event type and the mode in which the event was generated, the system will determine 1410 the bounding strokes associated with the event. Where the event is generated in circle-post mode, or if the event is a delete event, the bounding strokes will be a predefined number of strokes immediately succeeding the event. Where the event is generated in circle-pre mode, the bounding strokes will be a predefined number of strokes immediately preceding the event. Once the bounding strokes have been determined, the system may determine 1420 the horizontal and vertical extremities of the bounding strokes. The system may then determine 1430 all strokes which overlap a bounding rectangle which is defined by the horizontal and vertical extremities of the bounding strokes. The strokes so determined may then be used to generate the field associated with the event.

Returning to FIG. 13, it is further shown that a system in accordance with the invention may include a recognition engine 1360 for producing collections of character strings 1370, and an image data generator 1380 for producing image data 1390. The recognition engine 1360 and image data generator 1380 produce output which is based on input in the form of stroke data. Accordingly, the recognition engine 1360 and image data generator 1380 may be provided with input in the form of either strokes from a stroke collection or fields from a field collection.

A system in accordance with the invention may thus perform a variety of functions on a data stream recorded in accordance with the invention through reference to predefined events and strokes recorded in association with those events. This allows the system to provide discrete sets of information recorded by the device upon request, for example, by an application requiring all strokes of a predefined type. For example, consider that a calendar application wishes to be provided with all calendar entries noted in the recorded handwritten text. The system may accordingly determine all calendar events and provide character strings representing the handwritten text associated with those calendar events. Alternatively, consider that an application wishes to be provided with image data for all handwritten text of a particular page. The system may accordingly determine all strokes occurring on that page and provide image data for those strokes. In general, the function of the system will be facilitated by automatic generation of stroke and event collections upon acquisition by the system of a data stream. Generation of fields may be performed in accordance with requests received by the system.

Figure 15:
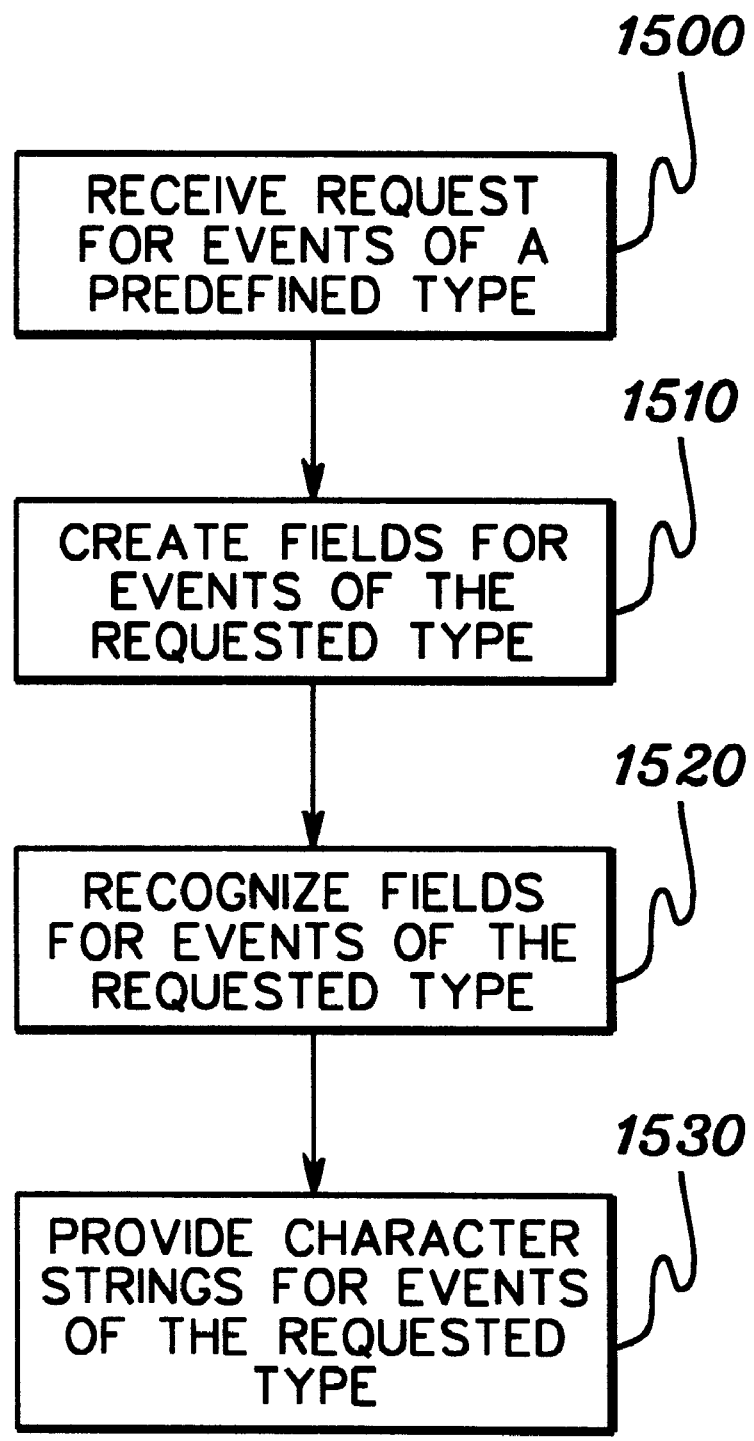
FIG. 15 illustrates an example of a process in accordance with the invention for generating character strings from strokes associated with events of a predefined type.

Accordingly, the system may provide character strings representing handwritten text associated with particular events. FIG. 15 provides an example of a process in accordance with the invention which may be implemented on a system to provide character strings associated with a given predefined event type. As shown in FIG. 15, when the system has received 1500 a request for events of a predefined type, for example, a request for calendar entries, the system may create 1510 fields for events of the requested type. The creation of fields may be done through reference to stroke and event collections as described above. The system may then recognize 1520 the strokes of each field by providing each field to the recognition engine. The system may then provide 1530 character strings for each event of the requested type to the requesting application.

Figure 16:
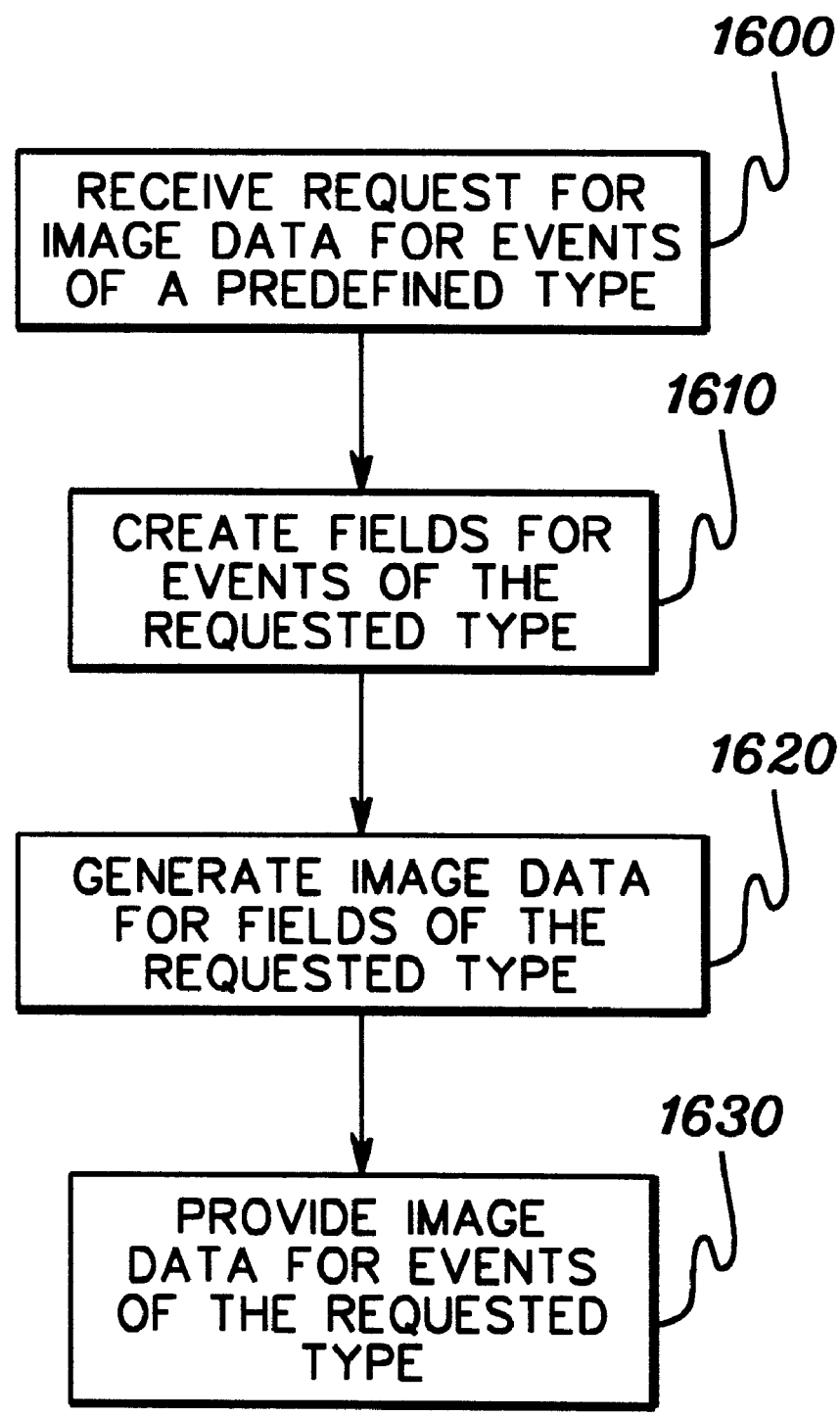
FIG. 16 illustrated an example of a process in accordance with the invention for generating image data for strokes associated with events of a predefined type.

Similarly, the system may provide image data for handwritten text associated with particular events. FIG. 16 provides an example of a process in accordance with the invention which may be implemented on a system to provide image data for strokes associated with a given predefined event type. As shown in FIG. 16, when the system has received 1600 a request for image data for events of a predefined type, for example, a request for all text of a particular page, the system may create 1610 fields for events of the requested type. The creation of fields may be done through reference to stroke and event collections as described above. The system may then generate 1620 image data for the strokes of each field by providing each field to the image data generator. The system may then provide 1630 image data for each event of the requested type to the requesting application.

IV Alternative Embodiments in Accordance with the Invention

A variety of additions and modifications to the disclosed embodiments may be found useful in particular applications of the invention. The following provides a disclosure of several additions or modifications. Those of ordinary skill in the art will appreciate other additions and modifications which are enabled through application of the knowledge currently available in the field.

In regard to the hardware used to implement the invention, it may be desirable to include certain enhanced communication features such as a modem or a fax modem. Such devices may, for example, be located externally to the unit and communicate with the unit through an RS-232 serial port. Alternatively, a modem with an RJ-11 connector may be provided internally to the recording unit.

Another hardware modification which may be desirable is a removable overlay pad comprising function labels for user invocation of events. In the embodiments described above, user invoked events are provided through operation of switches or soft buttons, each of which generally has a legend or icon associated with it to indicate its function. The present modification contemplates using removable overlays to define special functions associated with regions of the digitizer, where a variety of different customized overlays may be interfaced, such that each overlay generates a unique set of functions. Such a modification may be provided by providing on the unit an overlay receptacle for receiving overlays having a predetermined size and shape. For example, the overlay could be provided as a cardboard strip having printed icons or other legends thereon. The overlays may interact with the unit in several manners. In a first contemplated manner, the overlay may include an identifier such as a bar code which is recognized by the unit. The identifier causes the unit to associate a predefined function with each icon or legend area based on the identification of the overlay. Alternatively, the unit may be programmed by the user to associate a specific location if the digitizer with a predefined function. An overlay with the appropriate icon or legend could be placed on the digitizer to indicate this specific location. This allows the user to customize the functions provided and their locations.

Further suggested modifications which may involve both hardware and control software relate to the generation of new page events. In the exemplary embodiment described above, new page events are user invoked through operation of a switch or soft button. Alternatively, new page events may be generated through control signals provided by additional hardware components. In a first modification, it is contemplated that writing medium is affixed to the recording unit by means of a clamp or some similar device having jaws which open to release paper. It is contemplated that such a retaining means may have integrated therewith a switch for automatically generating a new page function each time the jaws are opened. In a second modification, it is contemplated that where paper affixed to a pad is employed, sound detecting hardware may be provided for detecting the sound of a page being torn from the pad. Detection of such a sound may be used to automatically generate a new page event. In a third modification, it is contemplated that specialized writing medium may be employed in which every individual sheet of the writing medium is provided with a machine readable identifier such as a bar code. Upon the detection of a new identifier, a new page event may be automatically generated and the new page may be automatically identified by means of the machine readable identifier.

Other suggested modifications which may involve both hardware and control software relate to the definition of fields. In the exemplary embodiment disclosed above, fields are generated by associating stroke data with event data. Alternatively, fields may be defined to correspond with predefined areas of the digitization tablet. Accordingly, such a field may be automatically associated with all strokes located within the predefined area.

Further suggested modifications may be made to the control software. In a first contemplated software modification, the system may be provided with functions for conveying the data stream generated by the unit in real time to a remote system by means of a communication link such as the IR transceiver. In a second contemplated modification, the system may be provided with functions for providing reminders to users of predefined user events, for example, the time and date of a meeting. For example, the system may include means for storing the time and date of a predefined user event, means for determining an instance of a time and date corresponding to the time and date of the predefined user event, and means for notifying the user of the instance associated with the time and date of the predefined user event.

A third contemplated software modification involves user invocation of functions. In the exemplary embodiment described above, user invocation of functions is accomplished by means of soft buttons or switches. In accordance with the contemplated modification, user invocation of a function may be accomplished by making a predefined stroke pattern using the stylus. For example, a stroke pattern in the form of making a "check mark" may be predefined as indicating that associated text is to be characterized as an entry in a "to do" list. Such stroke patterns may be defined as occurring in either the pen-up or pen-down condition. Accordingly, the contemplated modification involves means for detecting data representative of a predefined stroke pattern. Such means may be provided on-board the recording unit or on a remote system for processing data recorded by the recording unit.

A fourth contemplated software modification involves the manner in which stroke data is recorded. In the exemplary embodiment disclosed above, it is assumed that the recording unit records stroke data provided only during the pen-down condition. However, a user with a light touch may inadvertently fail to place enough pressure on the stylus tip at all times during writing to maintain the pen-down condition. Such inadvertancies will result in discontinuous strokes where continuous strokes were intended. In accordance with the contemplated modification, a predetermined number of stylus input samples are recorded before every pen-down event and after every pen-up event if the pen is in proximity to the digitizer. In this manner, sufficient data is retained to eliminate discontinuities in strokes. Alternatively, all pen coordinates may be recorded in both the pen up and pen down conditions. Processes may thus be provided for identifying discontinuities and incorporating the additional samples for purposes of providing accurate recognition and image data.

Thus, to summarize, the invention may be embodied in a recording unit which may be integrated with typical hand written record-making tasks such that digital copies of the handwritten records are generated and recorded by the unit responsive to the writing of the records. A recording unit in accordance with the invention may produce and record a data stream reflecting in sequential order the strokes made by a user of the unit and events occurring in conjunction with these strokes, including events which are automatically detected by the unit and events which are user-invoked. The apparatus may be used by placing a piece of paper or some other writing medium over the digitizing tablet and invoking a new page event. Upon providing an identifier to the unit which may be associated by the user with the new page of the writing medium, the user is free to write as normal on the page, and a digital copy of all strokes produced with a digitizer stylus will be recorded in the memory of the recording unit. User invoked events are preferably enabled through soft buttons provided on the digitizing tablet. A data stream recorded in accordance with the invention may be processed in accordance with requests for character strings or image data pertaining to recorded text.

While the specific embodiments described above provide structures and methods which are best modes presently known to the inventors for carrying out the invention, the invention is capable of a variety of alternative embodiments. Those of ordinary skill in the art will be aware of other modifications involving equivalent components, methods of operation and methods of use which may be made to the embodiments described herein without departing from the scope of the invention as defined in the following claims.

What is claimed is:

1. A system for recording strokes responsive to the writing thereof on a writing medium associated with the system, comprising:

a digitizing system capable of generating data representative of strokes produced on a writing medium located in proximity to a digitizing surface associated with the digitizing system, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks;

nonvolatile memory for storing data generated by said digitizing system;

means for recording in said nonvolatile memory data generated by said digitizing system;

means for detecting a predefined event occurring on said writing medium; and means for associating the detected predefined event with at least a portion of said strokes.

2. The system of claim 1, further comprising:

means for recording in said nonvolatile memory data representing said predefined event; and means for recording in said nonvolatile memory in association with said data representing said predefined event a time and date stamp indicating the time and date of detection of said predefined event.

3. The system of claim 2, wherein said means for detecting a predefined event comprises means for detecting a soft button event.

4. The system of claim 2, wherein said means for detecting a predefined event comprises means for detecting data representing a predefined stroke pattern.

5. The system of claim 2, wherein said means for detecting a predefined event comprises means for detecting a new page event.

6. The system of claim 5, wherein said means for detecting a new page event comprises:

means for detecting replacement of said writing medium with a different writing medium; and means for automatically generating a new page event upon said replacement.

7. The system of claim 2, wherein said means for detecting a predefined event comprises means for detecting a user invoked stroke characterization event.

8. The system of claim 7, further comprising means for recording in said nonvolatile memory in association with said data representing said predefined event data representing one or more bounding strokes.

9. The system of claim 1, further comprising means for retaining a writing medium in proximity to said digitizing surface such that said digitizing tablet is capable of digitizing strokes produced on said writing medium.

10. The system of claim 9, wherein said means for retaining is further capable of providing replicable alignment between said digitizing tablet and said writing medium.

11. The system of claim 1, wherein an active area of said digitizing tablet has a form factor of approximately 8.5 inches in width by 11.5 inches in length.

12. The system of claim 1, further comprising:
means for providing data generated by said digitizing tablet responsive to the generation thereof by said digitizing tablet.

13. The system of claim 1, further comprising:
means for storing a time and date of a predefined user event;
means for determining an instance of a time and date corresponding to said time and date of said predefined user event; and
means for notifying a user of said instance.

14. A method for processing a recorded data stream representative of handwritten strokes entered on a writing medium located proximate a digitizing surface associated with a digitizing system and events occurring in conjunction with the production of said handwritten strokes, comprising:
determining a predefined type of event for which data is to be provided;
detecting a predefined event occurring on said writing medium; and
associating the detected predefined event with at least a portion of said strokes entered on said writing medium;
wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks.

15. The method of claim 14, wherein determining one or more strokes comprises determining one or more strokes located within an area defined by one or more bounding strokes.

16. The method of claim 14, further comprising recognizing characters represented by said one or more strokes.

17. The method of claim 16, further comprising providing a character string corresponding to said characters.

18. The method of claim 14, further comprising generating image data representative of said strokes.

19. The method of claim 18, further comprising providing image data representative of said strokes.

20. The method of claim 19, wherein said providing comprises providing image data by means of a carrier frequency modulated in accordance with a facsimile transmission standard.

21. The method of claim 14, wherein determining one or more strokes comprises determining one or more strokes occurring within a predefined area.

22. A system for processing a recorded data stream representative of handwritten strokes entered on a writing medium disposed proximate a digitizing surface associated with a digitizing system and events occurring in conjunction with the production of said handwritten strokes, comprising;
means for determining a predefined type of event for which data is to be provided;
means for determining an event of said predefined type represented in said recorded data stream representing handwritten strokes entered on said writing medium disposed proximate said digitizing surface; and
means for determining one or more strokes associated with said event;
wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks.

23. The system of claim 22, wherein said means for determining one or more strokes comprises means for determining one or more strokes located within an area defined by one or more bounding strokes.

24. The system of claim 22, further comprising means for recognizing characters represented by said one or more strokes.

25. The system of claim 24, further comprising means for providing a character string corresponding to said characters.

26. The system of claim 22, further comprising means for generating image data representative of said strokes.

27. The system of claim 26, further comprising means for providing image data representative of said strokes.

28. The system of claim 27, wherein said means for providing comprises means for providing image data by means of a carrier frequency modulated in accordance with a facsimile transmission standard.

29. The system of claim 22, wherein said means for determining one or more strokes comprises means for determining one or more strokes occurring within a predefined area.

30. A system for recording strokes responsive to the writing thereof with a stylus, comprising:
a digitizing system capable of generating data representative of strokes produced by said stylus on a writing medium located in proximity to a digitizing surface associated with the digitizing system, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks;
first means capable of detecting a pen-down event and of generating data representative of said pen-down event;
second means capable of detecting a pen-up event and of generating data representative of said pen-up event;
means for sequentially storing data generated by said digitizing system and said first means and said second means;

means for comparing the data representative of strokes with prestored templates representing functional operations; and means for performing a functional operation if said data representative of strokes includes data matching one or more of said templates.

31. The system of claim 1, wherein the digitizing system is a digitizing tablet.

32. The method of claim 14, wherein the digitizing system is a digitizing tablet.

33. The system of claim 22, wherein the digitizing system is a digitizing tablet.

34. The system of claim 30, wherein the digitizing system is a digitizing tablet.

35. Apparatus for recording strokes responsive to the writing thereof on a writing medium associated with the system, comprising:

a digitizing system capable of generating data representative of strokes produced on a writing medium located in proximity to a digitizing surface associated with the digitizing system, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks;

nonvolatile memory for storing data generated by said digitizing system; and at least one processor operative to record in said nonvolatile memory data generated by said digitizing system, to detect a predefined event occurring on said writing medium, and to associate the detected predefined event with at least a portion of said strokes.

36. Apparatus for processing a recorded data stream representative of handwritten strokes entered on a writing medium located proximate a digitizing surface associated with a digitizing system and events occurring in conjunction with the production of said handwritten strokes, comprising:

at least one processor operative to determine a predefined type of event for which data is to be provided; to detect a predefined event occurring on said writing medium, and to associate the detected predefined event with at least a portion of said strokes entered on said writing medium, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks.

37. Apparatus for processing a recorded data stream representative of handwritten strokes entered on a writing medium disposed proximate a digitizing surface associated with a digitizing system and events occurring in conjunction with the production of said handwritten strokes, comprising;

at least one processor operative to determine a predefined type of event for which data is to be provided, to determine an event of said predefined type represented in said recorded data stream representing handwritten strokes entered on said writing medium disposed proximate said digitizing surface, and to determine one or more strokes associated with said event, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks.

38. Apparatus for recording strokes responsive to the writing thereof with a stylus, comprising:

a digitizing system capable of generating data representative of strokes produced by said stylus on a writing medium located in proximity to a digitizing surface associated with the digitizing system, wherein said writing medium substantially overlays at least a portion of said digitizing surface and is selectively removable therefrom, and further wherein the writing medium is not required to be substantially configured to operate in association with the digitizing system and is otherwise also useable in association with one or more conventional paper-based record making tasks; and at least one processor operative to detect a pen-down event and to generate data representative of said pen-down event, to detect a pen-up event and to generate data representative of said pen-up event, to sequentially store data generated by said digitizing system and in accordance with the pen-down and pen-up events, to compare the data representative of strokes with prestored templates representing functional operations, and to perform a functional operation if said data representative of strokes includes data matching one or more of said templates.

* * * * *